United States Patent [19]

Williams et al.

[11] Patent Number: 5,322,630
[45] Date of Patent: Jun. 21, 1994

[54] AMINE DERIVATIVES AS CORROSION INHIBITORS

[75] Inventors: Dennis A. Williams; James R. Looney; Daniel S. Sullivan, all of Houston; Brent I. Bourland, Kingwood, all of Tex.; John A. Haslegrave, Abingdon, England; Paul J. Clewlow, Faringdon, England; Niall Carruthers, Abingdon, England; Terence M. O'Brien, New Hinksey, England

[73] Assignee: Exxon Chemical Patents Inc., Linden, N.J.

[21] Appl. No.: 962,494

[22] Filed: Oct. 15, 1992

Related U.S. Application Data

[63] Continuation-in-part of Ser. No. 882,833, May 14, 1992, and a continuation-in-part of Ser. No. 882,848, May 14, 1992.

[51] Int. Cl.$^5$ .............................................. E21B 43/27
[52] U.S. Cl. .................................. 252/8.553; 166/300; 166/307; 166/312; 252/8.555
[58] Field of Search ................. 252/8.553, 8.555, 392, 252/394; 422/16; 208/47; 166/300, 307, 312

[56] References Cited

U.S. PATENT DOCUMENTS

| | | | |
|---|---|---|---|
| 2,995,603 | 8/1961 | Hutchison | 252/8.555 X |
| 3,510,282 | 5/1970 | Seffens | 252/392 X |
| 3,522,022 | 7/1970 | May et al. | 252/392 X |
| 3,758,493 | 9/1973 | Maddox | 252/390 X |
| 3,766,053 | 10/1973 | Seffens | 422/9 X |
| 3,787,227 | 1/1974 | Marans | 106/14.13 X |
| 3,819,328 | 6/1974 | Go | 422/3 |
| 3,894,849 | 7/1975 | Polss | 252/392 |
| 4,118,222 | 9/1978 | Caruso | 148/403 |
| 5,064,571 | 11/1991 | Speranza et al. | 252/392 |

Primary Examiner—Robert L. Stoll
Assistant Examiner—Valerie Fee
Attorney, Agent, or Firm—R. L. Graham

[57] ABSTRACT

A method of acidizing a subterranean formation with an acqueous acid solution wherein the acid solution contains corrosion inhibiting amounts of an amine derivative prepared by reacting an unsaturated carboxylic acid with (a) fatty amine or polyamine, or (b) a fatty amido amine or polyamine, or (c) a fatty imidazoline amine or polyamine. The derivative is characterized by the absence of primary amino groups, and preferably contains only tertiary amino groups.

16 Claims, No Drawings

AMINE DERIVATIVES AS CORROSION INHIBITORS

RELATED APPLICATIONS

This is a continuation-in-part of U.S. patent application Ser. No. 882,833, filed May 14, 1992 now pending and U.S. patent application Ser. No. 882,848, filed May 14, 1992 now pending.

BACKGROUND OF THE INVENTION

The present invention relates to the use of compounds and compositions as corrosion inhibitors in situations where they may come into contact with the natural environment e.g. by discharge of produced water, and to a method of inhibiting corrosion using these materials. In one preferred aspect, the present invention relates to the use of a nontoxic corrosion inhibitor in oil field acidizing operations.

In order to preserve metals, and particularly ferrous metals, in contact with corrosive liquids in gas and oil field applications, corrosion inhibitors are added to many systems, e.g. cooling systems, refinery units, pipelines, steam generators, oil production units, and oil field treating fluids. A variety of corrosion inhibitors are known. For example, GA-B-2009133 describes the use of a composition which comprises an amine-carboxylic acid such as dodecylamine propionic acid, and a nitrogen-containing compound containing an organic hydrophobic group, such as N-(3-octoxypropyl)-propylenediamine.

EP-A-256802 describes a method of inhibiting corrosion of metal surfaces in contact with a corrosive hydrocarbon-containing medium comprising contacting the metal surfaces with the reaction product of (a) tallow triamine or tallow tetramine and (b) an acrylic acid type compound, in which the ratio of the two reagents is preferably 1:1.

Although corrosion inhibitors of many types are known, the materials which have been found most effective in practice have the disadvantage of toxicity to the environment. Toxicity to the marine or freshwater environment is of particular concern. In gas and oil field applications, much work is done off-shore or on the coast. If a corrosion inhibitor enters the sea or a stretch of fresh water, on land or in lakes or streams, even at relatively low concentrations, the corrosion inhibitor can kill microorganisms, causing an imbalance in the environment. Attempts have therefore been made to identify materials which are successful corrosion inhibitors but at the same time are less toxic to the environment than known inhibitors. The applicants have found that adducts of a fatty amine and an unsaturated acid in which the product contains no primary amino groups, and only secondary or tertiary, more preferably tertiary, amine groups has a lower toxicity to the environment (referred to as ecotoxicity).

SUMMARY OF THE INVENTION

The present invention therefore provides use as a corrosion inhibitor in a marine or freshwater environment of an amine which is a compound of the formula I:

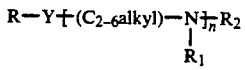

where
R is a $C_{6-20}$ hydrocarbon;
Y is one of the following:
(a) $-NR_1-$ where n is 1, 2, or 3;
(b) $-CO-NH-$ where n is an integer 1-6;
(c)

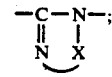

in which X is an alkylene group of 2 to 6 carbon atoms and n is an integer of 1 to 6;
$R_1$ is independently H, or $-[(CH_2)_{1-4}]$ COOH
or a $C_{6-20}$ hydrocarbon, or
a $C_{6-20}$ hydrocarbon carbonyl;
$R_2$ is H, or $[(CH_2)_{1-4}]$COOH or a $C_{-6-20}$ hydrocarbon $C_{6-20}$ hydrocarbonyl, where $R_1$ is the same or different from $R_2$,
wherein the compound contains at least one $(CH_2)_{1-4}$ COOH group or salt thereof and no primary amines.

As used herein, the term $C_{6-20}$ hydrocarbon carbonyl means a group having the following formula:

where $R_3$ is a $C_5-C_{19}$ hydrocarbon.

The inhibitor of Formula I is prepared by (a) reacting a fatty amine with a unsaturated carboxylic acid or (b) reacting a fatty acid with an amine to form an amide or imidazoline and then reacting this product with an unsaturated carboxylic acid. The final compound contains no primary amines. (For convenience, this is also referred to as no primary amino groups.)

The present invention also provides a method of inhibiting corrosion of a metal by a liquid system in, at or near, marine or freshwater environment which comprises providing in the liquid an amine as defined above.

It has been found that the amines defined above have favorable ecotoxicity levels in marine or freshwater environments. The ecotoxicity decreases with increasing substitutions on the N atoms present i.e. it appears that tertiary groups are less toxic than secondary groups which are in turn less toxic than primary groups. Preferably, therefore, each amine group is secondary or tertiary, more preferably tertiary.

Use in a marine or freshwater environment is intended to mean use in an environment in which the corrosion inhibitor in normal usage may come into contact with an area of seawater or fresh water or land.

A particular advantageous us of the low toxicity corrosion inhibitor of the present invention is in oil field acidizing operations used in the stimulation of subterranean formations. Such operations include hydraulic fracturing and matrix acidizing. In oil field acidizing, an acid solution is pumped through the well tubulars and injected into the formation where the acid reacts with formation material, increasing the permeability of the formation and/or reducing formation damage. Because of the corrosivity of the acid, corrosion inhibitors are required in the acid solution to protect the tubulars and other metals which the acid solution contacts. Following the acidizing operation, the spent acid, which itself may no longer be toxic, must be disposed of because of environmental concerns. It is increasingly important that the corrosion inhibitor be nontoxic or of low toxicity, since the spent acid may be disposed of in marine or fresh water environments.

DESCRIPTIONS OF THE PREFERRED EMBODIMENTS

As mentioned above, the method of the present invention involves the use of a low toxicity corrosion inhibitor in aqueous oil field liquids. The corrosion inhibitors are environmentally safe for disposal or in the case of spills of liquids containing them, the corrosion inhibitor useful in the present invention is an amine derivative having the general formula (I) indicated above. In preferred embodiments, the corrosion inhibitor will have two general forms: Formula IA and IB described below.

FORMULA IA

The corrosion inhibitor of FORMULA IA where Y is $-NR_1-$ and $R_2=R_1$ may be represented as follows:

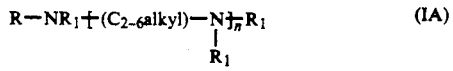

(IA)

where R and n are the same as described in FORMULA IA, and $R_1$ is H, $-[(CH_2)_{1-4}]COOH$, or $C_{6-20}$ hydrocarbon wherein the compound contains at least one $(CH_2)_{1-4}COOH$ or salt thereof and no primary amines.

The hydrocarbon group or groups of from 6 to 20 carbon atoms of FORMULA IA and IB may be straight or branched, saturated or unsaturated, and may be aliphatic or may contain one or more aromatic groups. Preferably the hydrocarbon group is straight chain aliphatic and is saturated, optionally with up to 20% of the chains being unsaturated. Preferably the hydrocarbon contains 12 to 20 carbon atoms, more preferably 16 to 20 carbon atoms. It is preferred that R is the hydrocarbon residue of a naturally occurring fatty acid, which is optionally hydrogenated e.g. the residue of caproic, caprylic, capric, lauric, myristic, palmitic, stearic, palmitoleic, oleic, linoleic or linolenic acid. The amines used in the present invention can conveniently be formed by the reaction of a fatty amine and an unsaturated acid in which case R corresponds to the fatty part of the amine. Fatty amines are readily available in which the fatty portion is a mixture of hydrocarbon groups. For example, the amine, diamine or triamine of hydrocarbon residues of coconut oil or tallow oil are readily available.

When $R_1$ of FORMULA IA is a hydrocarbon it may be the residue of a naturally occurring fatty acid as described above for R, or it may be an artificially synthesized hydrocarbon. If $R_1$ is a hydrocarbon, it is preferably a residue of a naturally occurring fatty acid.

However, $R_1$ is preferably H or $-[(CH_2)_{1-4}]COOH$, and most preferably $-[(CH_2)_{1-4}]COOH$. The alkyl group may be straight chain or branched. Conveniently the compound of FORMULA IA is produced by adding acrylic acid to a fatty amine, which results in a compound in which $R_1$ is $-CH_2CH_2COOH$.

The $C_{2-6}$ alkyl group linking the fatty hydrocarbon and amino groups in the compound of FORMULA IA may be straight or branched. Conveniently it is a propylene or hexylene group since the starting amines are either available commercially or can be readily synthesized. The amine of FORMULA IA may contain 1, 2, 3 or 4 amino groups. It is preferred for it to contain 2 amino groups since the tests carried out so far suggest that such compounds provide the optimum in terms of ease of production and handling, good corrosion inhibition properties and low ecotoxicity. Diamine compounds correspond to compounds of the FORMULA IA in which n is 1.

The amine may be present in the form of a salt, for example an alkali metal salt such as sodium or potassium, an alkaline earth metal salt such as magnesium or calcium, or an ammonium salt.

Preferred amines of FORMULA IA include those of FORMULA IIA:

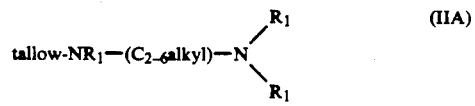

(IIA)

in which tallow indicates the residue of an acid found in beef tallow, and each $R_1$ is independently (a) H or (b) $-(C_{2-4}alkyl)COOH$ and salts thereof. Preferably $R_1$ is $-[(CH_2)_{1-4}]COOH$, conveniently $CH_2CH_2COOH$. Thus a particularly preferred compound is of FORMULA IIIA:

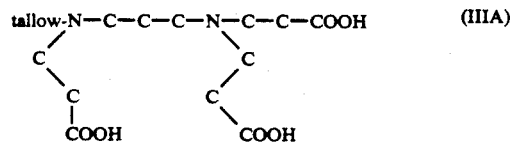

(IIIA)

Compounds of the FORMULA IA in which $R_1$ is H, a $C_{6-20}$ hydrocarbon or $-[(CH_2)_{2-4}]COOH$ may conveniently be produced by reacting an amine of the FORMULA IVA

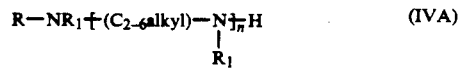

(IVA)

where R and n are as defined above and $R_1$ is H or a $C_{6-20}$ hydrocarbon, with an acid of FORMULA VA

$$CH_2=CR'-(CHR')_m-COZ$$ (VA)

in which m is 0, 1 or 2, each R' is hydrogen or when m is 1, R' may be methyl, and Z is OH or alkyl. To produce a compound in which $R_1$ is H, a $C_{6-20}$ hydrocarbon, or $-[(CH_2)_{1-4}]COOH$, the amine of FORMULA IVA may be reacted with a chloro acid of FORMULA VIA

$$Cl-[(CH_2)_{1-4}]COOH$$ (VIA)

The molar ratio of acid of FORMULA VA or VIA to amine of FORMULA IVA should be chosen to ensure the desired level of substitution takes place. Typically therefore to avoid the presence of primary amine groups the molar ratio will be at least 2:1, more preferably 3:1 when the starting amine contains two amino groups, at least 3:1, more preferably 4:1 when the starting amine is a triamine and so on. A slight molar excess (e.g. about 10%) of acid is generally used, e.g. for a diamine the acid may be used in a molar ratio of about 3.3:1.

Preferably the compounds of FORMULA IA are made by reacting the compounds of FORMULA IVA and VA since if the chloro acid is used as a starting material, it is generally difficult to remove all the chlorine-containing material from the product, and chlorine-containing compounds can damage the environment. Preferably the acid is acrylic acid.

The reaction of acrylic acid with the primary amine yields predominantly the B-amine propionic acid derivative directly. Depending on the distance between the amino group and the acid group, the product may be a cyclic internal salt.

The reaction may be carried out by heating a solution of the amine in a suitable solvent, conveniently an alcohol such as isobutanol or isopropanol or water. The required quantity of the acid is gradually introduced. The temperature at which the reaction is carried out is generally from 50° C. up to the reflux temperature of the reaction mixture, typically 60° to 100° C.

The compounds tend not to be soluble in water or brine, but are dispersible to some extent in water.

FORMULA IB

The corrosion inhibitor of FORMULA IB may be represented as follows:

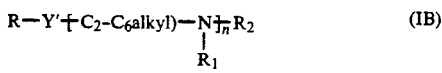

(IB)

Y' is the group represented in (b) and (c) of FORMULA I; and where n, R, $R_1$, and $R_2$ are described in FORMULA I and wherein the compound contains at least one $(CH_2)_{1-4}COOH$ group and no primary amines. $R_2$ is preferably H, or the carboxylic acid group, or the hydrocarbonyl group.

The amine derivative (Y') may contain a heterocyclic group of the formula

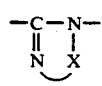

In this formula X may be an alkylene group of 2 to 6 carbon atoms e.g. ethylene or propylene. When X is ethylene, the heterocyclic group is imidazoline. X may be straight chain or may be branched, such that the heterocyclic ring is substituted by an alkyl of up to 4 carbon atoms.

The derivative of FORMULA IB may contain one or more amido groups.

$R_1$ in the derivative of FORMULA IB is preferably H or a carboxylic acid group of 2 to 5 carbon atoms. Tests currently appear to indicate tertiary groups are less toxic than secondary amino groups, which are in turn less toxic than primary amino groups. If a heterocyclic ring is present the nitrogen atoms in the ring are considered tertiary. In view of the favorable results shown for N— substitution it is preferred that each $R_1$ is a carboxylic acid group. Conveniently, $R_1$ is derived from acrylic acid, in which case $R_1$ in FORMULA IB is —$CH_2CH_2COOH$. $R_2$ is similarly conveniently derived from acrylic acid and is therefore preferably —$CH_2CH_2COOH$ or H.

The derivative may optionally contain 1 or more alkyl amino groups between the group Y and the group $R_2$. Each amino group may be optionally substituted by an acid group or a $C_{6-20}$ hydrocarbon or $C_6$-$C_{20}$ hydrocarbon-carbonyl. Preferably the derivative contains 2 or 3 amino groups i.e. n is 2 or 3.

The $C_{2-6}$alkyl group linking the group $Y^1$ and each amino group may be a straight or branched alkyl group. Conveniently, it is an ethylene, propylene or hexylene group since the starting amines to produce such compounds are either available commercially or can be readily synthesized.

The derivative may be present in the form of a salt, for example an alkali metal salt such as sodium or potassium, an alkaline earth metal salt such as magnesium or calcium, or an ammonium salt.

Particularly preferred derivatives are those of FORMULA (IIB).

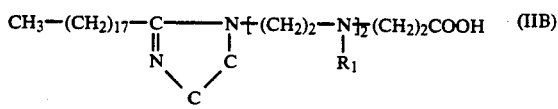

(IIB)

where each $R_1$ is H or $(CH_2)_2COOH$.

Compounds of the FORMULA IB may conveniently be produced by reacting an amine or a heterocyclic compound with an unsaturated acid. This may be represented as reacting compound of the FORMULA (IIIB):

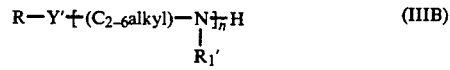

(IIIB)

in which R, Y' and n are as defined above and each $R_1'$ is independently H, $C_{6-20}$ hydrocarbon, or $C_{6-20}$ hydrocarbon-carbonyl with an acid of the FORMULA (IVB):

(IVB)

in which m is 0, 1 or 2, each R' is hydrogen or, when m is 1, R' may be methyl, and Z is OH or alkoxy. If Z is alkoxy the product is hydrolysed to produce the corresponding acid.

The salt, if desired, may e formed using processes known in the art.

The amine derivatives may also be produced by reacting a compound of the FORMULA IIIB as defined above with an acid of the FORMULA VB:

(VB)

where Q is halogen, preferably chloro, and optionally forming a salt thereof.

The molar ratio of acid of FORMULA IVB or VB to compound of FORMULA IIIB should be chosen to ensure that the desired level of N-substitution takes place. N-atoms which are part of an amide group will not react with the acid but any other —NH— groups will react. Typically, therefore, to avoid the presence of primary amino groups the molar ratio will be at least 1:1 when n is 1 in the starting compound, more preferably 2:1 when n is 1 and $R'_1$ is H. A slight molar excess (e.g. about 10%) of acid is generally used, e.g. for n=1 and $R_1' = H$, the acid is preferably used in a molar ratio of about 2.2:1.

Preferably the compounds of FORMULA IB are made by reacting the compounds of FORMULA IIIB and IVB since if the chloro acid is used as a starting material it is generally difficult to remove all the chlorine-containing material from the product, and chlorine-containing compounds can damage the environment. Preferably, the compound of FORMULA IVB is acrylic acid.

The reaction of compounds of FORMULA IIIB and IVB or VB may be undertaken by dissolving the compound of FORMULA IIB in a convenient solvent, e.g. secondary butanol, adding the acid and heating the mixture until the reaction is complete. The reaction may be carried out at temperatures of from room temperature up to the reflux temperature of the reaction mixture, typically 60° C. to 120° C.

The starting compounds of FORMULA IIIB may be synthesized by reacting a fatty acid with an alkyl amine. Suitable fatty acids are those indicated on page 3, with respect to the derivation of R. In particular, tall oil fatty acid (TOFA) and oleic acid are suitable starting materials. The acid and amine initially react to produce an amide i.e. a compound of the FORMULA IIIB in which Y is —CO—NH—. Dehydrolysis of the amide results in cyclisation to give a compound of the FORMULA IIIB in which Y is a heterocyclic ring. An incomplete cyclisation reaction results in a mixture of compounds of FORMULA IIIB in which Y is an amide group and those in which Y is a heterocyclic ring. Some starting material and some mono-, di- or polyamides may also be present, depending on the starting amine in the system. This mixture may be used to produce a successful corrosion inhibitor.

The alkyl amine is chosen to give the appropriate heterocyclic ring and/or amide group(s) and, if desire, alkyl amine group attached to the heterocyclic ring or amide. Suitable alkyl amines include e.g. ethylene diamine, diethylenetriamine (DETA), triethylenetetramine (TETA) and tetraethylenepentamine (TEPA).

The reaction of the fatty acid and an alkyl amine may be carried out by heating the reactants in a suitable solvent e.g. an aromatic hydrocarbon. The reaction may be carried out initially at the reflux temperature of the mixture, e.g. 140° C. to 180° C., and the temperature ma be increased to e.g. 200° to 230° C. to form the heterocyclic ring.

OPERATION

As mentioned above, the method of the present invention employs an amine corrosion inhibitor of FORMULA I in the acidizing of subterranean formations. Any of the known oil field acids may be used. These are referred to herein as "well treating acids" and include aqueous solutions of hydrochloric acid (HCl), hydrofluoric acid (HF), mixtures of HCl and HF (i.e. mud acid), acetic acid, formic acid, and other organic acids and anhydrides. The most common acids are 3% HCl, 7½% HCl, 15% HCl, 28% HCl and blends of HCl and HF (mud acid). Mud acid is normally a blend of 6 to 12% of HCl and 1¼ to 6% HF.

The amine derivative of FORMULA I may be added to the acid solution in the form of a solution or dispersion in water and/or an organic solvent. Examples of suitable solvents are alcohols such as methanol, ethanol, isopropanol, isobutanol, secondary butanol, glycols and aliphatic and aromatic hydrocarbons. The solubility of the compounds in water can be improved by forming a salt e.g. a sodium, potassium, magnesium or ammonium salt.

The amount of active ingredient in the acid solution to achieve sufficient corrosion protection varies with the system in which the inhibitor is being used. Methods for monitoring the severity of corrosion in different systems are well known, and may be used to decide the effective amount of active ingredient required in a particular situation.

In general it is envisioned that the derivatives will be used in amounts of up to 15,000 ppm, but typically within the range of 500 to 5,000 ppm based on the weight of the acid solution (e.g. 0.5 to 40 gal/1000 gal or 0.05–4.0% vol).

In the compositions the derivatives may be used in combination with known corrosion inhibitors, although to achieve the low ecotoxicity which is desirable, it is preferred that the composition contains only corrosion inhibitors which have low ecotoxicity.

The compositions may contain other materials which it is known to include in corrosion inhibiting compositions e.g. scale inhibitors and/or surfactants. In some instances it may be desirable to include a biocide in the composition.

EXAMPLES

The following examples illustrate the preparation of amine derivatives useful in the present invention.

EXAMPLE 1

A solution of the appropriate starting amine in isopropyl alcohol (50% based on the total amount of reactants to be used) was heated to 60° C. with stirring under nitrogen. The requisite quantity of acrylic acid was then added dropwise. After addition had been completed, the reaction temperature was raised to 85° C. and maintained at this temperature for 10 hours. Clear, pale yellow-colored solutions resulted.

Table A sets out the starting amines and amounts of acid used to form the adducts.

TABLE A

| EXAMPLE | STARTING AMINE | MOLAR RATIO OF AMINE TO ACRYLIC ACID |
| --- | --- | --- |
| 1 | Coco-1,3-diaminopropane[a] | 1:1.1 |
| 2 | Coco-1,3-diaminopropane | 1:2.2 |
| 3 | Coco-1,3-diaminopropane | 1:3.3 |
| 4 | Tallow-1,3-diaminopropane[b] | 1:1.1 |
| 5 | Tallow-1,3-dimainopropane | 1:2.2 |
| 6 | Tallow-1,3-diaminopropane | 1:3.3 |

[a]Sold as Duomeen C by Akzo
[b]Sold as Duomeen T by Akzo

EXAMPLE 2

(1) Preparation of imidazoline amine

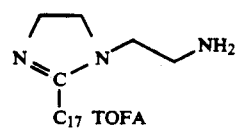

Reactants

TOFA (tall oil fatty acid, $C_{17}CO_2H$)—238.4 g (0.8M)

DETA (diethylene triamine) $(H_2NCH_2CH_2)_2NH$—90.79 g (0.88M, 1.1 eq)
SOLVESSO 100 (aromatic hydrocarbons)—82 g

Method

To a stirring solution of TOFA (238.4 g) in Solvesso 100 (82 g) at room temperature under $N_2$ was added DETA (90.79 g). A slight temperature rise was observed and also a slight color change (pale yellow to pale orange). The stirring solution was then heated to reflux (160° C.).

After refluxing for about 1½ hours approximately 15 ml of a milky emulsion was obtained. The temperature was increased to 210° C. to remove the second mole of $H_2O$ to form the required imidazoline.

(2) Synthesis of TOFA/TETA Imidazoline Plus 3Eq. Acrylic Acid

Reagents

TOFA/ TETA IMIDAZOLINE (80% in solvesso 100) 145 g (0.25M)
ACRYLIC ACID 59.4 g (0.82M, 3.3 eq).
Secondary Butanol (SBA) 205 g

Method

A solution of TOFA/TETA imidazoline (145 g) in SBA (205 g) was stirred at room temperature under $N_2$. To this was carefully added, dropwise, acrylic acid (59.4 g). A temperature rise from 26° C. was observed.

After exotherms had ceased, the reaction temperature was raised to reflux (about 100° C.). The reaction was monitored to completion using thin layer chromatography (TLC). (1:1 acetone/heptane, silica gel place, $I_2$ development).

Formulation

Inhibitor A is representative of FORMULA IB and is an example of chemistry described for Example 2 in the previous section.

Inhibitor A is a TOFA/TETA imidazoline reacted with 3.5 Eq. of acrylic acid. It is 50% by weight active in sec-butyl alcohol solvent. Inhibitor A has the following formula:

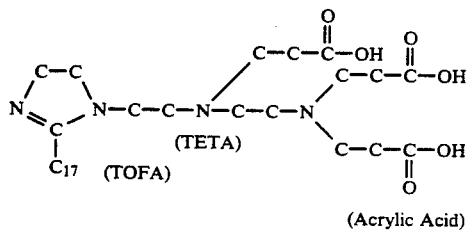

Inhibitor B is representative of FORMULA IA and is an example of chemistry described for Example 1 in the previous section. It is the reaction product of Tallow—1, 3, diaminopropane and 3.3 Eq. of acrylic acid. It is then reacted with NaOH to form the mono-sodium salt. It is 31.3% by weight active in a water/isopropanol solvent. Inhibitor B has the following formula:

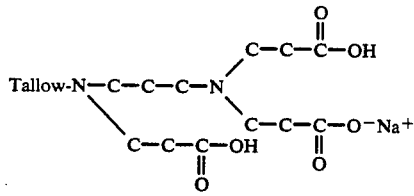

Inhibitor C is representative of FORMULA IB and is an example of the chemistry described for Example 2 in the previous section.

Like Inhibitor A, it is 50% by weight active in sec-butyl alcohol. However, it is the reaction product of a TOFA/TEPA imidazoline and 4.5 Eq. of acrylic acid. Inhibitor C has the following formula:

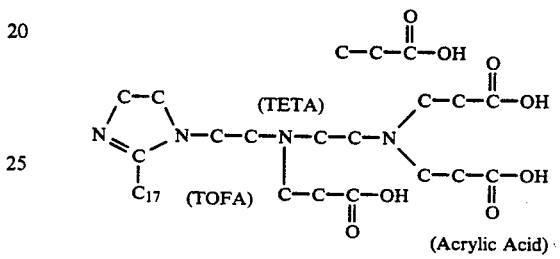

Inhibitor D is representative of FORMULA IB and is an example of the chemistry described in section (i) of Example 2 in the previous section. It is the 2:1 mole ration of TOFA/TEPA amide reacted with 5.0 Eq. of acrylic acid. It is 50% by weight active in sec-butyl alcohol. Inhibitor D has the following formula:

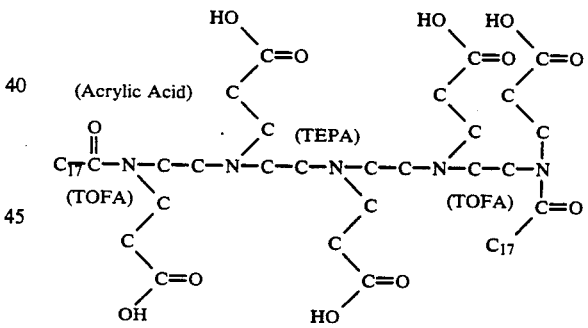

Inhibitors A, B, C, and D were added to the acid formulation without modification. In addition, at 200° F. and higher the known acid corrosion inhibitor extenders, formic acid or potassium iodide, were evaluated with inhibitors A, B and C to see if synergies existed.

Test Procedure

Each Inhibitor (A, B, C, or D) was added at the listed concentration to an aqueous acid solution and mixed. Inhibitor extender, if any, was added and mixed. A pre-weighed steel coupon was placed in a bottle with 100 ml of the acid solution. The types of steel tested included N-80 tubing steel, CR-13 tubing steel, and CR-2205 tubing steel (API Specification Grade Duplex containing 21.9 wt. % chromium). All tests, at 200° F. or lower temperature, were carried out at atmospheric pressure for 6 hours at test temperature. Those tests performed at a temperature of 225° F. were performed at elevated pressure (2,000 psi) and for a test time of 4 hours at temperature.

After exposure to the acid solution for the reported time, the coupons were cleaned, dried, and weighed. The corrosion rate was calculated from the weight loss and reported in Tables I, II, III, and IV.

Table I gives the data measured at 125° F. As can be seen, addition of Inhibitors A, B, C, or D substantially reduces the rate as compared with rates measured for coupons in acid with no inhibitor. Especially notable are the results for CR-13 and CR-2205 in 15% HCl (Tests 16 through 33). These tests illustrate that as little as 2 gallons of Inhibitor per 1,000 gallons of acid will protect the steel. Of the four inhibitors, A and C appear to be the best for this application.

Results of tests in 10% Formic acid are less dramatic because the CR-13 and CR-2205 are less affected by this acid. However, corrosion rates are dramatically reduced by addition of the inhibitors. Results for tests with N-80 in both 10% Formic and 15% HCl show the inhibitors are very effective in controlling corrosion.

Table II contains results for tests conducted at 175° F. Excellent results were observed for all Inhibitors. Again it is notable that excellent results were observed when the Inhibitors were tested on CR-13 steel coupons.

The effect of corrosion inhibitor in 10% Formic Acid was more easily measured at 175° F. This is because the corrosion rates are much higher and the corrosion inhibiting effect of compounds A, B, C, and D were much more evident.

Table III lists results of testing at 200° F. Tests with Inhibitors A, B or C without extender show them to lower corrosion rates as compared with a blank, but the rates are higher than desired. When the inhibitors are used in conjunction with the known acid corrosion inhibitor extender KI, the results are satisfactory. Use of the extender Formic Acid did not show a similar effect.

Table IV lists the results of tests conducted at 225° F., 2000 psi pressure, and for a test time at 225° F. of 4 hours. The combination of inhibitor and KI gave good protection to N-80 and CR-13 steel in both 12/3 Mud acid and 15% HCl acid. The use of formic acid as an extender did not give satisfactory results.

TABLE I

| TEST NO. | INHIBITOR TYPE | GPT | COUPON TYPE | ACID | CORR. RATE (LB/FT$^2$) |
|---|---|---|---|---|---|
| 1 | — | — | CR-13 | 10% FORMIC | 0.0442 |
| 2 | A | 5 | CR-13 | 10% FORMIC | 0.0083 |
| 3 | B | 5 | CR-13 | 10% FORMIC | 0.0082 |
| 4 | C | 5 | CR-13 | 10% FORMIC | 0.0097 |
| 5 | D | 5 | CR-13 | 10% FORMIC | 0.0089 |
| 6 | — | — | CR-2205 | 10% FORMIC | 0.0009 |
| 7 | A | 5 | CR-2205 | 10% FORMIC | 0.0006 |
| 8 | B | 5 | CR-2205 | 10% FORMIC | 0.0004 |
| 9 | C | 5 | CR-2205 | 10% FORMIC | 0.0007 |
| 10 | D | 5 | CR-2205 | 10% FORMIC | 0.0008 |
| 11 | — | — | N-80 | 10% FORMIC | 0.1684 |
| 12 | A | 5 | N-80 | 10% FORMIC | 0.0162 |
| 13 | B | 5 | N-80 | 10% FORMIC | 0.0149 |
| 14 | C | 5 | N-80 | 10% FORMIC | 0.0156 |
| 15 | D | 5 | N-80 | 10% FORMIC | 0.0147 |
| 16 | — | — | CR-13 | 15% | 0.1438 |
| 17 | A | 2 | CR-13 | 15% | 0.0048 |
| 18 | A | 5 | CR-13 | 15% | 0.0048 |
| 19 | B | 2 | CR-13 | 15% | 0.0111 |
| 20 | B | 5 | CR-13 | 15% | 0.0101 |
| 21 | C | 2 | CR-13 | 15% | 0.0066 |
| 22 | C | 5 | CR-13 | 15% | 0.0064 |
| 23 | D | 2 | CR-13 | 15% | 0.0124 |
| 24 | D | 5 | CR-13 | 15% | 0.0067 |
| 25 | — | — | CR-2205 | 15% | 0.1268 |
| 26 | A | 2 | CR-2205 | 15% | 0.0664 |
| 27 | A | 5 | CR-2205 | 15% | 0.0496 |
| 28 | B | 2 | CR-2205 | 15% | 0.1209 |
| 29 | B | 5 | CR-2205 | 15% | 0.1066 |
| 30 | C | 2 | CR-2205 | 15% | 0.0486 |
| 31 | C | 5 | CR-2205 | 15% | 0.0421 |
| 32 | D | 2 | CR-2205 | 15% | 0.1135 |
| 33 | D | 5 | CR-2205 | 15% | 0.0954 |
| 34 | — | — | N-80 | 15% | 0.0602 |
| 35 | A | 5 | N-80 | 15% | 0.0061 |
| 36 | B | 5 | N-80 | 15% | 0.0105 |
| 37 | C | 5 | N-80 | 15% | 0.0069 |
| 38 | D | 5 | N-80 | 15% | 0.0079 |

TABLE II

| TEST NO. | INHIBITOR TYPE | GPT | COUPON TYPE | ACID | CORR. RATE (LB/FT$^2$) |
|---|---|---|---|---|---|
| 1 | — | — | CR-13 | 10% FORMIC | 0.0952 |
| 2 | A | 5 | CR-13 | 10% FORMIC | 0.0182 |
| 3 | B | 5 | CR-13 | 10% FORMIC | 0.0210 |
| 4 | C | 5 | CR-13 | 10% FORMIC | 0.0224 |
| 5 | D | 5 | CR-13 | 10% FORMIC | 0.0227 |
| 6 | — | — | N-80 | 10% FORMIC | 0.3487 |
| 7 | A | 5 | N-80 | 10% FORMIC | 0.0340 |

TABLE II-continued

| TEST NO. | INHIBITOR TYPE | GPT | COUPON TYPE | ACID | CORR. RATE (LB/FT²) |
|---|---|---|---|---|---|
| 8 | B | 5 | N-80 | 10% FORMIC | 0.0335 |
| 9 | C | 5 | N-80 | 10% FORMIC | 0.0386 |
| 10 | D | 5 | N-80 | 10% FORMIC | 0.0309 |
| 11 | — | — | CR-13 | 15% | 0.3324 |
| 12 | A | 5 | CR-13 | 15% | 0.0177 |
| 13 | B | 5 | CR-13 | 15% | 0.0398 |
| 14 | C | 5 | CR-13 | 15% | 0.0217 |
| 15 | D | 5 | CR-13 | 15% | 0.0297 |
| 16 | — | — | N-80 | 15% | 0.1188 |
| 17 | A | 5 | N-80 | 15% | 0.0116 |
| 18 | B | 5 | N-80 | 15% | 0.0232 |
| 19 | C | 5 | N-80 | 15% | 0.0128 |
| 20 | D | 5 | N-80 | 15% | 0.0174 |
| 21 | — | — | CR-13 | 12/3 MUD | 0.6534 |
| 22 | A | 5 | CR-13 | 12/3 MUD | 0.0424 |
| 23 | B | 5 | CR-13 | 12/3 MUD | 0.0634 |
| 24 | C | 5 | CR-13 | 12/3 MUD | 0.0561 |
| 25 | D | 5 | CR-13 | 12/3 MUD | 0.0760 |
| 26 | — | — | N-80 | 12/3 MUD | 0.1244 |
| 27 | A | 5 | N-80 | 12/3 MUD | 0.0239 |
| 28 | B | 5 | N-80 | 12/3 MUD | 0.0313 |
| 29 | C | 5 | N-80 | 12/3 MUD | 0.0256 |
| 30 | D | 5 | N-80 | 12/3 MUD | 0.0304 |
| 31 | — | — | CR-13 | 6/1.5 MUD | 1.1556 |
| 32 | A | 5 | CR-13 | 6/1.5 MUD | 0.0171 |
| 33 | B | 5 | CR-13 | 6/1.5 MUD | 0.0249 |
| 34 | C | 5 | CR-13 | 6/1.5 MUD | 0.0189 |
| 35 | D | 5 | CR-13 | 6/1.5 MUD | 0.0258 |
| 36 | — | — | N-80 | 6/1.5 MUD | 0.1094 |
| 37 | A | 5 | N-80 | 6/1.5 MUD | 0.0112 |
| 38 | B | 5 | N-80 | 6/1.5 MUD | 0.0160 |
| 39 | C | 5 | N-80 | 6/1.5 MUD | 0.0122 |
| 40 | D | 5 | N-80 | 6/1.5 MUD | 0.0201 |

TABLE III

| TEST NO. | INHIBITOR TYPE | GPT | ADDITIVE TYPE | AMT. | COUPON TYPE | ACID | CORR. RATE (LB/FT²) |
|---|---|---|---|---|---|---|---|
| 1 | — | — | — | — | CR-13 | 10% FORMIC | 0.2478 |
| 2 | A | 05 | — | — | CR-13 | 10% FORMIC | 0.0714 |
| 3 | A | 20 | — | — | CR-13 | 10% FORMIC | 0.0628 |
| 4 | B | 05 | — | — | CR-13 | 10% FORMIC | 0.0856 |
| 5 | C | 05 | — | — | CR-13 | 10% FORMIC | 0.0801 |
| 6 | C | 20 | — | — | CR-13 | 10% FORMIC | 0.0730 |
| 7 | — | — | — | — | N-80 | 10% FORMIC | 0.4340 |
| 8 | A | 05 | — | — | N-80 | 10% FORMIC | 0.1691 |
| 9 | A | 20 | — | — | N-80 | 10% FORMIC | 0.1193 |
| 10 | B | 05 | — | — | N-80 | 10% FORMIC | 0.1813 |
| 11 | C | 05 | — | — | N-80 | 10% FORMIC | 0.1773 |
| 12 | C | 20 | — | — | N-80 | 10% FORMIC | 0.1317 |
| 13 | — | — | — | — | CR-13 | 15% | 0.8038 |
| 14 | A | 05 | — | — | CR-13 | 15% | 0.1578 |
| 15 | A | 10 | — | — | CR-13 | 15% | 0.2279 |
| 16 | A | 10 | FORMIC | 10 GPT | CR-13 | 15% | 0.2413 |
| 17 | A | 10 | KI | 10 PPT | CR-13 | 15% | 0.0515 |
| 18 | A | 10 | KI | 20 PPT | CR-13 | 15% | 0.0489 |
| 19 | A | 10 | KI | 20 PPT | CR-13 | 15% | 0.0422 |
| 20 | A | 10 | KI | 30 PPT | Cr-13 | 15% | 0.0398 |
| 21 | A | 20 | — | — | CR-13 | 15% | 0.2862 |
| 22 | A | 20 | FORMIC | 10 GPT | CR-13 | 15% | 0.2363 |
| 23 | A | 20 | KI | 20 PPT | CR-13 | 15% | 0.0543 |
| 24 | A | 20 | KI | 30 PPT | CR-13 | 15% | 0.0451 |
| 25 | A | 30 | — | — | CR-13 | 15% | 0.2263 |
| 26 | A | 30 | FORMIC | 10 GPT | CR-13 | 15% | 0.2286 |
| 27 | B | 05 | — | — | CR-13 | 15% | 0.2978 |
| 28 | B | 10 | KI | 20 PPT | CR-13 | 15% | 0.0589 |
| 29 | B | 10 | KI | 30 PPT | CR-13 | 15% | 0.0298 |
| 30 | B | 20 | KI | 20 PPT | CR-13 | 15% | 0.0470 |
| 31 | B | 20 | KI | 30 PPT | CR-13 | 15% | 0.0420 |
| 32 | C | 05 | — | — | CR-13 | 15% | 0.1853 |
| 33 | C | 10 | KI | 20 PPT | CR-13 | 15% | 0.0560 |
| 34 | C | 10 | KI | 30 PPT | CR-13 | 15% | 0.0480 |
| 35 | C | 20 | — | — | CR-13 | 15% | 0.3621 |
| 36 | C | 20 | KI | 20 PPT | CR-13 | 15% | 0.0565 |
| 37 | C | 20 | KI | 30 PPT | CR-13 | 15% | 0.0503 |
| 38 | — | — | — | — | N-80 | 15% | 0.5016 |
| 39 | A | 05 | — | — | N-80 | 15% | 0.0692 |
| 40 | A | 10 | — | — | N-80 | 15% | 0.0743 |

TABLE III-continued

| TEST NO. | INHIBITOR TYPE | GPT | ADDITIVE TYPE | AMT. | COUPON TYPE | ACID | CORR. RATE (LB/FT$^2$) |
|---|---|---|---|---|---|---|---|
| 41 | A | 10 | FORMIC | 10 GPT | N-80 | 15% | 0.0770 |
| 42 | A | 10 | KI | 10 PPT | N-80 | 15% | 0.0462 |
| 43 | A | 10 | KI | 20 PPT | N-80 | 15% | 0.0303 |
| 44 | A | 10 | KI | 20 PPT | N-80 | 15% | 0.0399 |
| 45 | A | 10 | KI | 20 PPT | N-80 | 15% | 0.0403 |
| 46 | A | 10 | KI | 30 PPT | N-80 | 15% | 0.0271 |
| 47 | A | 10 | KI | 30 PPT | N-80 | 15% | 0.0327 |
| 48 | A | 20 | — | — | N-80 | 15% | 0.0795 |
| 49 | A | 20 | FORMIC | 10 GPT | N-80 | 15% | 0.0729 |
| 50 | A | 30 | — | — | N-80 | 15% | 0.0663 |
| 51 | A | 30 | FORMIC | 10 GPT | N-80 | 15% | 0.0712 |
| 52 | B | 05 | — | — | N-80 | 15% | 0.1140 |
| 53 | B | 10 | KI | 20 PPT | N-80 | 15% | 0.0537 |
| 54 | C | 05 | — | — | N-80 | 15% | 0.0816 |
| 55 | C | 10 | KI | 20 PPT | N-80 | 15% | 0.0591 |
| 56 | C | 20 | — | — | N-80 | 15% | 0.1014 |
| 57 | A | 10 | KI | 20 PPT | CR-13 | 12/3 MUD | 0.0577 |
| 58 | A | 20 | — | — | CR-13 | 12/3 MUD | 0.2169 |
| 59 | B | 10 | KI | 20 PPT | CR-13 | 12/3 MUD | 0.0889 |
| 60 | C | 10 | KI | 20 PPT | CR-13 | 12/3 MUD | 0.0761 |
| 61 | C | 20 | — | — | CR-13 | 12/3 MUD | 0.2704 |
| 62 | A | 10 | KI | 20 PPT | N-80 | 12/3 MUD | 0.0263 |
| 63 | A | 10 | KI | 20 PPT | N-80 | 12/3 MUD | 0.0308 |
| 64 | A | 10 | KI | 30 PPT | N-80 | 12/3 MUD | 0.0217 |
| 65 | A | 20 | — | — | N-80 | 12/3 MUD | 0.0631 |
| 66 | B | 10 | KI | 20 PPT | N-80 | 12/3 MUD | 0.0446 |
| 67 | C | 10 | KI | 20 PPT | N-80 | 12/3 MUD | 0.0391 |
| 68 | C | 20 | — | — | N-80 | 12/3 MUD | 0.0676 |
| 69 | A | 20 | — | — | CR-13 | 6/1.5 MUD | 0.0629 |
| 70 | C | 20 | — | — | CR-13 | 6/1.5 MUD | 0.0693 |
| 71 | A | 20 | — | — | N-80 | 6/1.5 MUD | 0.0231 |
| 72 | C | 20 | — | — | N-80 | 6/1.5 MUD | 0.0237 |

TABLE IV

| TYPE NO. | INHIBITOR TYPE | GPT | ADDITIVE TYPE | AMT. | COUPON TYPE | ACID | CORR. RATE (LB/FT$^2$) |
|---|---|---|---|---|---|---|---|
| 1 | — | — | — | — | CR-13 | 12/3 MUD | 0.8851 |
| 2 | A | 40 | KI | 80 PPT | CR-13 | 12/3 MUD | 0.0870 |
| 3 | — | — | — | — | N-80 | 12/3 MUD | 0.7153 |
| 4 | A | 20 | FORMIC | 20 GPT | N-80 | 12/3 MUD | 0.1833 |
| 5 | A | 40 | KI | 50 PPT | N-80 | 12/3 MUD | 0.0539 |
| 6 | A | 40 | KI | 80 PPT | N-80 | 12/3 MUD | 0.0420 |
| 7 | C | 40 | KI | 50 PPT | N-80 | 12/3 MUD | 0.0566 |
| 8 | — | — | — | — | CR-13 | 15% | 0.8403 |
| 9 | A | 40 | KI | 80 PPT | CR-13 | 15% | 0.0939 |
| 10 | — | — | — | — | N-80 | 15% | 0.7044 |
| 11 | A | 20 | FORMIC | 20 GPT | N-80 | 15% | 0.2309 |
| 12 | A | 40 | KI | 50 PPT | N-80 | 15% | 0.0798 |
| 13 | A | 40 | KI | 80 PPT | N-80 | 15% | 0.0615 |
| 14 | C | 40 | KI | 50 PPT | N-80 | 15% | 0.0754 |

ECOTOXICITY

The toxicity of the compounds was measured by assessing the concentration of each compound required to kill 50% of the microorganism *Tisbe battagliai*. This concentration is termed the LC50 and is expressed in mg/l. The samples used in the tests are described below.

| Sample 1 | TOFA/TETA IMIDAZOLINE +1 equivalent of acrylic acid (No Salt) (Same as Inhibitor A with lower substitution) |
|---|---|
| Sample 2 | Same as 1 except 2 equivalents of acrylic acid (No Salt) (Same as Inhibitor A with lower substitution) |
| Sample 3 | Same as 1 except 3 equivalents of acrylic acid (No Salt) (Inhibitor A) |

The results are given in TABLE V.

TABLE V

| IDENTIFICATION | TIME (HRS) | CATEGORY OF LC$_{50}$ (mg/l) | | |
|---|---|---|---|---|
| | | <10 | 10-100 | 100-1000 |
| Sample 1 | 24 | | X | |
| | 48 | X | | |
| Sample 2 | 24 | | | X |
| | 48 | | X | |
| Sample 3 | 24 | | | X |
| | 48 | | | X |

It can be seen from this that the addition of more acrylic acid groups (i.e. increasing the N-substitution) gives lower toxicity.

Additional ecotoxicity tests were carried out using the following samples:

| Sample 4 | Duomeen T - acrylic acid (1 eq.)$^2$ ampholyte (30%) |
|---|---|
| Sample 5 | Duomeen T - acrylic acid (2 eq.)$^2$ ampholyte (30%) |

|  |  |
|---|---|
| Sample 6 | Duomeen T - acrylic acid (e eq.) ampholyte (30%) (Inhibitor B) |

[2]Same as Inhibitor B but with lower substitution.

The results are given in TABLE VI.

TABLE VI

SCREENING TEST FOR THE TOXICITY OF CHEMICALS TO TISBE BATTAGLIAI

| SAMPLE IDENTIFICATION | TIME (HRS) | CATEGORY OF LC50 (mg/l) | | | |
|---|---|---|---|---|---|
| | | <10 | 10-100 | 100-1000 | <1000 |
| Sample 4 | 24 | | X | | |
| | 48 | X | | | |
| Sample 5 | 24 | | | | X |
| | 48 | | | X | |
| Sample 6 | 24 | | | | X |
| | 48 | | | X | |

Growth inhibition tests have also been carried out to assess the impact of the compounds on the marine algae *Skeletonema costatum*. This is a test which is becoming required by some off-shore authorities, and is therefore of particular interest when considering the practical applications of the compounds.

| MARINE PHYTOPLANKON-INHIBITION OF GROWTH RATE TEST CONDITIONS | |
|---|---|
| Test Organisms: | *Skeletonema Costatum* (Greville) Cleve, Clone Skel-5. |
| Incubation: | 3 Days at 14° C., in light/darkness cycles of 14 hrs./10 hrs. |
| pH Tolerance: | 7.5-9.2. |
| Test Samples: | Aliquots of each sample are weighed into phytoplankton medium and extracted; moderate shaking for 20 hrs. at 14° C. |
| Control Compound: | Na-dodecyl-sulphate. Normally a concentration of 1.3 mg/kg gives 30 to 70% of normal growth rate. Measured in this test: 30% to 55%. |

RESULTS

Results are calculated as the concentration of compound required to inhibit 50% growth of algae during three days of exposure, termed $EC_{50}$, given in mg/kg (ppm). the interval $EC_{20}$ to $EC_{80}$ is also given. The results are presented in TABLE VII.

TABLE VII

INHIBITION OF GROWTH RATE OF ALGAE SKELETONEMA COSTATUM

| SAMPLE | $EC_{20}$ | $EC_{50}$ | $EC_{80}$ |
|---|---|---|---|
| Sample 4 | 0.30 | 0.45 | 0.63 |
| Sample 5 | 1.26 | 2.00 | 2.82 |
| Sample 6 | 1.88 | 3.16 | 4.47 |

It can be seen from this that the compounds containing secondary and tertiary amines are much less ecotoxic than those which contain a significant proportion of primary amines.

What is claimed is:

1. A method of acidizing a subterranean formation penetrated by a borehole which has metal pipe positioned therein wherein an aqueous acid solution is pumped down said pipe and into the formation, the improvement comprising introducing a corrosion inhibitor into the aqueous acid solution at a concentration to inhibit corrosion of the metal, said corrosion inhibitor comprising a compound of the following formula:

$$R-Y+(C_{2-6}alkyl)-N\overset{+}{\underset{R_1}{\,}}_n R_2 \quad (I)$$

where
R is a $C_{6-20}$ hydrocarbon;
Y is one of the following:
(a) $-NR_1-$ where n is 1, 2, or 3;
(b) $-CO-NH-$ where n is an integer 1-6;
(c)

$$-\underset{\underset{N\diagdown X\diagup}{\|}}{C}-N-;$$

in which X is an alkylene group of 2 to 6 carbon atoms and n is an integer of 1 to 6;
$R_1$ is independently H, or
or a $C_{6-20}$ hydrocarbon or $-(CH_2)_{1-4}COOH$
a $C_{6-20}$ hydrocarbon carbonyl; and
$R_2$ is H, or $-(CH_2)_{1-4}COOH$ or $C_{6-20}$ hydrocarbon-carbonyl or a $C_6-C_{20}$ hydrocarbon
wherein the compound contains at least one $-(CH_2)_{1-4}-COOH$ group or salt thereof and no primary amino groups.

2. The method of claim 1 in which each amino group in the compound is tertiary.

3. The method of claim 1 in which in the amine R is the hydrocarbon residue of a naturally occurring fatty acid.

4. The method of claim 1 wherein the amine corrosion inhibitor has the formula:

tallow-N(CH2CH2-N(CH2COOH)-CH2CH2COOH)CH2COOH or a salt thereof.

5. The method of claim 1 wherein Y is $$-\underset{\underset{N\diagdown X\diagup}{\|}}{C}-N-$$

where X is an alkylene group of 2 to 6 carbon atoms and n is 1 to 6.

6. The method of claim 1 wherein Y is an amide and $-CO-N-$ and n is an integer of 1-6.

7. The method of claim 1 wherein the compound is of the formula (III):

$$CH_3+CH_2)_{17}-\underset{\underset{N\diagdown X\diagup}{\|}}{C}-N+(CH_2)_2 N+(CH_2)_2 COOH \quad (II)$$
$$\qquad\qquad\qquad\qquad\qquad\qquad\quad R_1$$

where each $R_1$ is H or $-(CH_2)_2COOH$; or salt thereof.

8. A method of acidizing a subterranean formation penetrated by a borehole which has metal pipe positioned therein wherein an aqueous acid solution is pumped down said pipe and into the formation, the improvement comprising introducing a corrosion inhibitor into the aqueous acid solution at a concentration to inhibit corrosion of the metal, said corrosion inhibitor comprising a compound of the following formula:

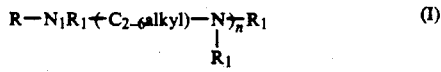 (I)

where
R is a $C_{6-20}$ hydrocarbon;
n is 1, 2, or 3;
$R_1$ is independently H, or —$(CH_2)_{1-4}COOH$ or a $C_{6-20}$ hydrocarbon; where the compound contains at least one group or salt thereof and no primary amines.

9. The method of claim 8 wherein n is 1 and R is a residue of an acid found in coconut oil and tallow oil.

10. The method of claim 8 wherein the corrosion inhibitor is the reaction product of a coco or tallow diaminopropane with acrylic acid.

11. In a method of acidizing a subterranean formation penetrated by a borehole which has metal pipe positioned therein wherein an aqueous acid solution is pumped down said pipe and into the formation, the improvement comprising introducing a corrosion inhibitor into the aqueous acid solution at a concentration to inhibit corrosion of the metal, said corrosion inhibitor comprising a compound which is the reaction product of a condensation reaction between a $C_2$–$C_6$ alkyl di- or polyamine and a $C_{-6-20}$ fatty acid, subsequently reacted with a $C_3$–$C_5$ unsaturated carboxylic acid or halocarboxylic acid, wherein the reaction product contains no primary amino groups.

12. An inhibited well treating fluid for acidizing subterranean formations which comprises:
(a) an aqueous acid solution;
(b) inhibiting amounts of a corrosion inhibitor dissolved or dispersed in said aqueous acid solution, said corrosion inhibitor having the following formula:

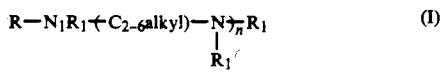 (I)

where
R is a $C_{6-20}$ hydrocarbon;
Y is one of the following:

(1) —$NR_1$— where n is 1, 2, or 3;
(2) —CO—NH— where n is an integer 1–6;
(3)

in which X is an alkylene group of 2 to 6 carbon atoms and n is an integer of 1 to 6;
$R_1$ is independently H, or $(CH_2)_{1-4}COOH$ or a $C_{6-20}$ hydrocarbon, or
a $C_{6-20}$ hydrocarbon carbonyl; and
$R_2$ is H, or —$(CH_2)_{1-4}COOH$, or a hydrocarbon, or $C_{6-20}$ hydrocarbon-carbonyl, the compound containing at least one —$(CH_2)_{1-4}COOH$; group or salt thereof and no primary amino groups.

13. A method of acidizing a subterranean formation penetrated by a borehole which has metal pipe positioned therein wherein an aqueous acid solution is pumped down said pipe and into the formation, the improvement comprising introducing a corrosion inhibitor into the aqueous acid solution at a concentration to inhibit corrosion of the metal, said corrosion inhibitor comprising reaction product of (a) a $C_6$–$C_{20}$ alkyl $C_2$–$C_6$ alkylene polyamine containing from 2 to 4 N atoms having at least one reactive H and (b) an unsaturated $C_3$–$C_5$ carboxylic acid to form a substituted polyamine having no primary amino groups.

14. The method of claim 13 wherein the amount of carboxylic acid is sufficient to produce a substituted amine with all tertiary amino groups.

15. A method of acidizing a subterranean formation penetrated by a borehole which has metal pipe positioned therein wherein an aqueous acid solution is pumped down said pipe and into the formation, the improvement comprising introducing a corrosion inhibitor into the aqueous acid solution at a concentration to inhibit corrosion of the metal, said corrosion inhibitor comprising a compound prepared by reacting a fatty acid with a $C_2$–$C_6$ alkylene polyamine having from 2 to 6N atoms to form an amino amide, and subsequently reacting the amide with a $C_3$–$C_5$ unsaturated carboxylic acid to form a compound having no primary amino groups.

16. The method of claim 15 wherein reaction of the fatty acid and the polyamine produces a heterocyclic compound containing a $C_2$–$C_6$ alkylene group in the ring.

* * * * *